US008126710B2

United States Patent
Gemello et al.

(10) Patent No.: US 8,126,710 B2
(45) Date of Patent: Feb. 28, 2012

(54) CONSERVATIVE TRAINING METHOD FOR ADAPTING A NEURAL NETWORK OF AN AUTOMATIC SPEECH RECOGNITION DEVICE

(75) Inventors: Roberto Gemello, Torino (IT); Franco Mana, Torino (IT)

(73) Assignee: Loquendo S.p.A., Turin (IT)

( * ) Notice: Subject to any disclaimer, the term of this patent is extended or adjusted under 35 U.S.C. 154(b) by 628 days.

(21) Appl. No.: 11/921,303

(22) PCT Filed: Jun. 1, 2005

(86) PCT No.: PCT/EP2005/052510
§ 371 (c)(1),
(2), (4) Date: Mar. 11, 2009

(87) PCT Pub. No.: WO2006/128496
PCT Pub. Date: Dec. 7, 2006

(65) Prior Publication Data
US 2009/0216528 A1    Aug. 27, 2009

(51) Int. Cl.
*G10L 15/16* (2006.01)
*G10L 11/00* (2006.01)
*G10L 15/00* (2006.01)

(52) U.S. Cl. .................. 704/232; 704/202; 704/251

(58) Field of Classification Search .................. 704/232, 704/255, 256.5, E15.008, 9, 17, 32, 36, 202
See application file for complete search history.

(56) References Cited

U.S. PATENT DOCUMENTS

| 5,285,522 | A | * | 2/1994 | Mueller | 704/232 |
| 5,307,444 | A | * | 4/1994 | Tsuboka | 706/20 |
| 5,369,726 | A | * | 11/1994 | Kroeker et al. | 704/236 |
| 5,600,753 | A | * | 2/1997 | Iso | 704/200 |
| 5,687,286 | A | * | 11/1997 | Bar-Yam | 704/232 |
| 5,794,197 | A | * | 8/1998 | Alleva et al. | 704/255 |
| 6,026,358 | A | * | 2/2000 | Tomabechi | 704/232 |
| 6,253,181 | B1 | * | 6/2001 | Junqua | 704/255 |
| 6,324,510 | B1 | * | 11/2001 | Waibel et al. | 704/256.7 |
| 6,801,891 | B2 | * | 10/2004 | Garner et al. | 704/254 |

OTHER PUBLICATIONS

Li et al. "A Cascaded Recurrent Neural Network for Real-time Non-linear Adaptive Filtering". IEEE International Conference on Neural Networks, pp. 857-862 vol. 2, San Francisco, 1993.*
Parisi et al. "A Generalized Learning Paradigm Exploiting the Structure of Feedforward Neural Networks". iEEE Transactions on Neural Networks, vol. 7 No. 6, pp. 1450-1460, Nov. 1996.*
Neto, J. et al., "Speaker-Adaptation for Hybrid HMM-ANN Continuous Speech Recognition System," Proc. Of Eurospeech 1995, 4 Sheets (1995).

(Continued)

*Primary Examiner* — Talivaldis I Smits
*Assistant Examiner* — Jesse Pullias
(74) *Attorney, Agent, or Firm* — Hamilton, Brook, Smith & Reynolds, P.C.

(57) ABSTRACT

A method of adapting a neural network of an automatic speech recognition device, includes the steps of: providing a neural network including an input stage, an intermediate stage and an output stage, the output stage outputting phoneme probabilities; providing a linear stage in the neural network; and training the linear stage by means of an adaptation set; wherein the step of providing the linear stage includes the step of providing the linear stage after the intermediate stage.

16 Claims, 5 Drawing Sheets

OTHER PUBLICATIONS

Neto, J. et al., "An Incremental Speaker-Adaptation Technique for Hybrid HMMM-MLP Recognizer," Proc. Of Intl. Conf. On Spoken Language Processing (ICSLP) 1996, Philadelphia, pp. 1289-1292, (1996).

Waterhouse, S. et a., "Smoothed Local Adaptation of Connectionist Systems," Proc. Of Intl. Conf. On Spoken Language Processing (ICSLP) 1996, Philadelphia, 4 Sheets, (1996).

Abrash, V., "Mixture Input Transformations for Adaptation of Hybrid Connectionist Speech Recognizers," Eurospeech 1997, Rhodes, Greece, 4 Sheets, (1997).

Bishop, C. M., "Neural Networks and Error Backpropagation Learning," Oxford University Press, pp. 140-148, (1995).

Benzeghiba, M. F. et al., "Hybrid HMM/ANN and GMM Combination for User-Customized Password Speaker Verification," IDIAP Research Report, IDIAP-RR 02-45, pp. 1-8, (Nov. 19, 2002).

Gemello, R. et al., "Linear Input Network Based Speaker Adaptation in the Dialogos System," Neural Network Proceedings of 1998, The 1998 IEEE In'tl. Joint Conf., Anchorage, AK, IEEE, US, vol. 3, pp. 2190-2195, (1998).

Mana, F. et al., "Linear Input Network for Neural Network Automata Model Adaptation," Proceedings of the 2002, $12_{th}$ IEEE Workshop, Piscataway, NJ, pp. 617-626, (2002).

\* cited by examiner

CONSERVATIVE TRAINING METHOD FOR ADAPTING A NEURAL NETWORK OF AN AUTOMATIC SPEECH RECOGNITION DEVICE

CROSS REFERENCE TO RELATED APPLICATION

This application is a national phase application based on PCT/EP2005/052510, filed Jun. 1, 2005, the content of which is incorporated herein by reference.

BACKGROUND OF THE INVENTION

1. Field of the Invention

The present invention relates to the field of automatic speech recognition. More particularly, the present invention relates to a method of adapting a neural network of an automatic speech recognition device, a corresponding adapted neural network and a corresponding automatic speech recognition device.

2. Description of the Related Art

An automatic speech recognition device is an apparatus which is able to recognise voice signals such as words or sentences uttered in a predefined language.

An automatic speech recognition device may be employed for instance in devices for converting voice signals into written text or for detecting a keyword allowing a user to access a service. Further, an automatic speech recognition device may be employed in telephone systems supporting particular services, such as providing a user with the telephone number of a given telephone subscriber.

In order to recognise a voice signal, an automatic speech recognition device performs steps, which will be briefly described herein after.

The automatic speech recognition device receives the voice signal to be recognised through a phonic channel. Examples of phonic channels are a channel of a fixed telephone network, of a mobile telephone network, or the microphone of a computer.

The voice signal is firstly converted into a digital signal. The digital signal is periodically sampled with a certain sampling period, typically of a few milliseconds. Each sample is commonly termed "frame". Successively, each frame is associated to a set of spectral parameters describing the voice spectrum of the frame.

Then, such a set of spectral parameters is sent to a pattern matching block. For each phoneme of the language for which the automatic speech recognition device is intended, the pattern matching block calculates the probability that the frame associated to the set of spectral parameters corresponds to that phoneme.

As it is known, a phoneme is the smallest portion of a voice signal such that, replacing a first phoneme with a second phoneme in a voice signal in a certain language, two different signifiers of the language may be obtained.

A voice signal comprises a sequence of phonemes and transitions between successive phonemes.

For simplicity, in the following description and in the claims, the term "phoneme" will comprise both phonemes as defined above and transitions between successive phonemes.

Thus, generally speaking, the pattern matching block calculates a high probability for the phoneme corresponding to an input frame, a low probability for phonemes with voice spectrum similar to the voice spectrum of the input frame, and a zero probability for phonemes with a voice spectrum different from the voice spectrum of the input frame.

However, frames corresponding to the same phoneme may be associated to different sets of spectral parameters. This is due to the fact that the voice spectrum of a phoneme depends on different factors, such as the characteristics of the phonic channel, of the speaker and of the noise affecting the voice signal.

Phoneme probabilities associated to successive frames are employed, together with other language data (such, for instance, vocabulary, grammar rules, and/or syntax rules) to reconstruct words or sentences corresponding to the sequence of frames.

As already mentioned, the step of calculating phoneme probabilities of an input frame is performed by a pattern matching block. For instance, the pattern matching block may be implemented through a neural network.

A neural network is a network comprising at least one computation unit, which is called "neuron".

A neuron is a computation unit adapted to compute an output value as a function of a plurality of input values (also called "pattern"). A neuron receives the plurality of input values through a corresponding plurality of input connections. Each input connection is associated to a respective weight. Each input value is firstly multiplied by the respective weight. Then, the neuron sums all the weighted input values. It might also add a bias, i.e.:

$$a = \sum_i w_i x_i + b, \qquad [1]$$

wherein a is the weighted linear combination of the input values, $w_i$ is the i-th input connection weight, $x_i$ is the i-th input value and b is the bias. In the following, for simplicity, is will be assumed that the bias is zero.

Successively, the neuron transforms the linear sum in [1] according to an activation function g(.). The activation function may be of different types. For instance, it may be either a Heaviside function (threshold function), or a sigmoid function. A common sigmoid function is defined by the following formula:

$$g(a) = \frac{1}{1 + \exp(-a)}. \qquad [2]$$

This type of sigmoid function is an increasing, [0;1]-limited function; thus, it is adapted to represent a probability function.

The activation function may also be a linear function, e.g. g(a)=k*a, where k is a constant; in this case, the neuron is termed "linear neuron".

Typically, a neural network employed in an automatic speech recognition device is a multi-layer neural network.

A multi-layer neural network comprises a plurality of neurons, which are grouped in two or more cascaded stages. Typically, neurons of a same stage have the same activation function.

A multi-layer neural network typically comprises an input stage, comprising a buffer for storing an input pattern. In the speech recognition field, such an input pattern comprises a set of spectral parameters of an input frame, and sets of spectral parameters of a few frames preceding and following the input frame. In total, a pattern typically comprises sets of spectral parameters of seven or nine consecutive frames.

The input stage is typically connected to an intermediate (or "hidden") stage, comprising a plurality of neurons. Each input connection of each intermediate stage neuron is adapted to receive from the input stage a respective spectral parameter. Each intermediate stage neuron computes a respective output value according to formulas [1] and [2].

The intermediate stage is typically connected to an output stage, also comprising a plurality of neurons. Each output stage neuron has a number of input connections which is equal to the number of intermediate stage neurons. Each input connection of each output stage neuron is connected to a respective intermediate stage neuron. Each output stage neuron computes a respective output value as a function of the intermediate stage output values.

In the speech recognition field, each output stage neuron is associated to a respective phoneme. Thus, the number of output stage neurons is equal to the number of phonemes. The output value computed by each output stage neuron is the probability that the frame associated to the input pattern corresponds to the phoneme associated to the output stage neuron.

For simplicity, a multi-layer network with a single intermediate stage has been described above. However, a multi-layer network may comprise a higher number of cascaded intermediate stages (typically two or three) between the input stage and the output stage.

In order that a neural network acquires the ability of computing, for each input frame, the phoneme probabilities, a training of the neural network is required.

Training is typically performed through a training set, i.e. a set of sentences that, once uttered, comprise all the phonemes of the language. Such sentences are usually uttered by different speakers, so that the network is trained in recognizing voice signals uttered with different voice tones, accents, or the like. Besides, different phonic channels are usually employed, such as different fixed or mobile telephones, or the like. Besides, the sentences are uttered in different environments (car, street, train, or the like), so that the neural network is trained in recognising voice signals affected by different types of noise.

Therefore, training a network through such a training set results in a "generalist" neural network, i.e. a neural network whose performance, expressed as a word (or phoneme) recognition percentage, is substantially homogeneous and independent from the speaker, the phonic channel, the environment, or the like.

However, in some cases, an "adapted" neural network may be desirable, i.e. a neural network whose performance is improved when recognising a predefined set of voice signals. For instance, a neural network may be:
  speaker-adapted: performance is improved when voice signals are uttered by a certain speaker;
  channel-adapted: performance is improved when voice signals are carried through a certain phonic channel;
  vocabulary-adapted: performance is improved when voice signals comprise a predefined set of words; or
  application-adapted: performance is improved when voice signals have application-dependent features (type of noise and type of speaker, type of channel and type of vocabulary, etc. . . . )

In the following description and claims, the expression "adaptation set" will refer to a predetermined set of voice signals for which a neural network is adapted. An adaptation set comprises voice signals with common features, such as voice signals uttered by a certain speaker, as well as voice signals comprising a certain set of words, as well as voice signals affected by a certain noise type, or the like.

In the art, methods for adapting a neural network are known, i.e. methods for improving the performance of a given generalist neural network for a given adaptation set.

For instance, J. Neto et al. "Speaker-adaptation for hybrid HMM-ANN continuous speech recognition system", Proc. of Eurospeech 1995 presents and evaluates some techniques for speaker-adaptation of a hybrid HMM-artificial neural network (ANN) continuous speech recognition system. For instance, the LIN technique employs a trainable Linear Input Network (LIN) to map the speaker-dependent input vectors (typically PLP cepstral coefficients) to a SI (speaker-independent) system. This mapping is trained by minimising the error at the output of the connectionist system while keeping all the other parameter fixed. A further adaptation technique presented in this paper is the Retrained Speaker-Independent (RSI) adaptation, wherein, starting from a SI system, the full connectionist component is adapted to the new speaker. Further, this paper presents the Parallel Hidden Network (PHN), wherein additional, trainable hidden units are placed in the connectionist system; these extra units connect to input and outputs just like ordinary hidden units. During speaker adaptation, weights connecting to/from these units are adapted while keeping all other parameters fixed. Finally, this paper presents a GAMMA approach, wherein the speaker-dependent input vectors are mapped to the SI system (as in the LIN technique) using a gamma filter.

J. Neto et al. "An incremental speaker-adaptation technique for hybrid HMM-MLP recognizer", Proc. of Intl. Conf. on Spoken Language Processing (ICSLP) 1996, Philadelphia, 1289-1292, describes a speaker-adaptation technique applied to a hybrid HMM-MLP system which is based on an architecture that employs a trainable LIN to map the speaker specific feature input vectors to the SI system.

S. Waterhouse et al. "Smoothed local adaptation of connectionist systems", Proc. of Intl. Conf. on Spoken Language Processing (ICSLP) 1996, Philadelphia, describes a technique by which the transform may be locally linear over different regions of the input space. The local linear transforms are combined by an additional network using a nonlinear transform.

V. Abrash, "Mixture input transformations for adaptation of hybrid connectionist speech recognizers", Eurospeech 1997, Rhodes (Greece), describes an algorithm to train mixtures of transformation networks (MTN) in the hybrid connectionist recognition framework. This approach is based on the idea of partitioning the acoustic feature space into R regions and training an input transformation for each region.

SUMMARY OF THE INVENTION

The Applicant has noticed that the performance of an adapted neural network can be improved over the performance of the neural networks adapted according to the above cited known methods.

Therefore, the object of the present invention is providing a method of adapting a neural network of an automatic speech recognition device allowing to obtain an adapted neural network with improved performance, for a given adaptation set.

According to a first aspect, the present invention provides a method of adapting a neural network of an automatic speech recognition device, the method comprising the steps of: providing a neural network comprising an input stage for storing at least one voice signal sample, an intermediate stage and an output stage, said output stage outputting phoneme probabilities; providing a linear stage in said neural network; and training said linear stage by means of an adaptation set;

wherein the step of providing said linear stage comprises the step of providing said linear stage after said intermediate stage.

Advantageously, the method of the present invention allows to obtain an adapted neural network with improved performance over a neural network adapted according to the prior art, in particular according to the above cited LIN technique. Adaptation according to the present invention is more effective, thus resulting in an increased word/phoneme recognition percentage.

According to a preferred embodiment, the step of training said linear stage comprises training the linear stage so that the phoneme probability of a phoneme belonging to an absent class is equal to the phoneme probability of said phoneme calculated by said neural network before the step of providing a linear stage. Such a conservative adaptation training advantageously allows to prevent a neural network adapted according to the present invention from loosing its ability in recognising phonemes absent from the adaptation set. Thus, according to this preferred embodiment of the invention, the adapted neural networks exhibit good performance also in recognising voice signals which are not fully comprised into the adaptation set.

Profitably, the further linear stage training is carried out by means of an Error Back-propagation algorithm.

Profitably, an equivalent stage could be provided, such an equivalent stage being obtained by combining the further linear stage and either the following intermediate stage or the output stage.

According to a second aspect, the present invention provides a neural network comprising an input stage for storing at least one voice signal sample, an intermediate stage, an output stage, and a linear stage which is adapted to be trained by means of an adaptation set, said output stage being adapted to output phoneme probabilities, wherein said linear stage is provided after said intermediate stage.

According to a third aspect, the present invention provides an automatic speech recognition device comprising a pattern matching block comprising a neural network as set forth above.

According to a fourth aspect, the present invention provides a computer program comprising computer program code means adapted to perform all the steps of the above method when the program is run on a computer.

According to a fifth aspect, the present invention provides a computer readable medium having a program recorded thereon, the computer readable medium comprising computer program code means adapted to perform all the steps of the above method when the program is run on a computer.

BRIEF DESCRIPTION OF THE DRAWINGS

The present invention will become fully clear after reading the following detailed description, given by way of example and not of limitation, to be read with reference to the attached figures. In the figures.

DETAILED DESCRIPTION OF THE INVENTION

Figure 1:
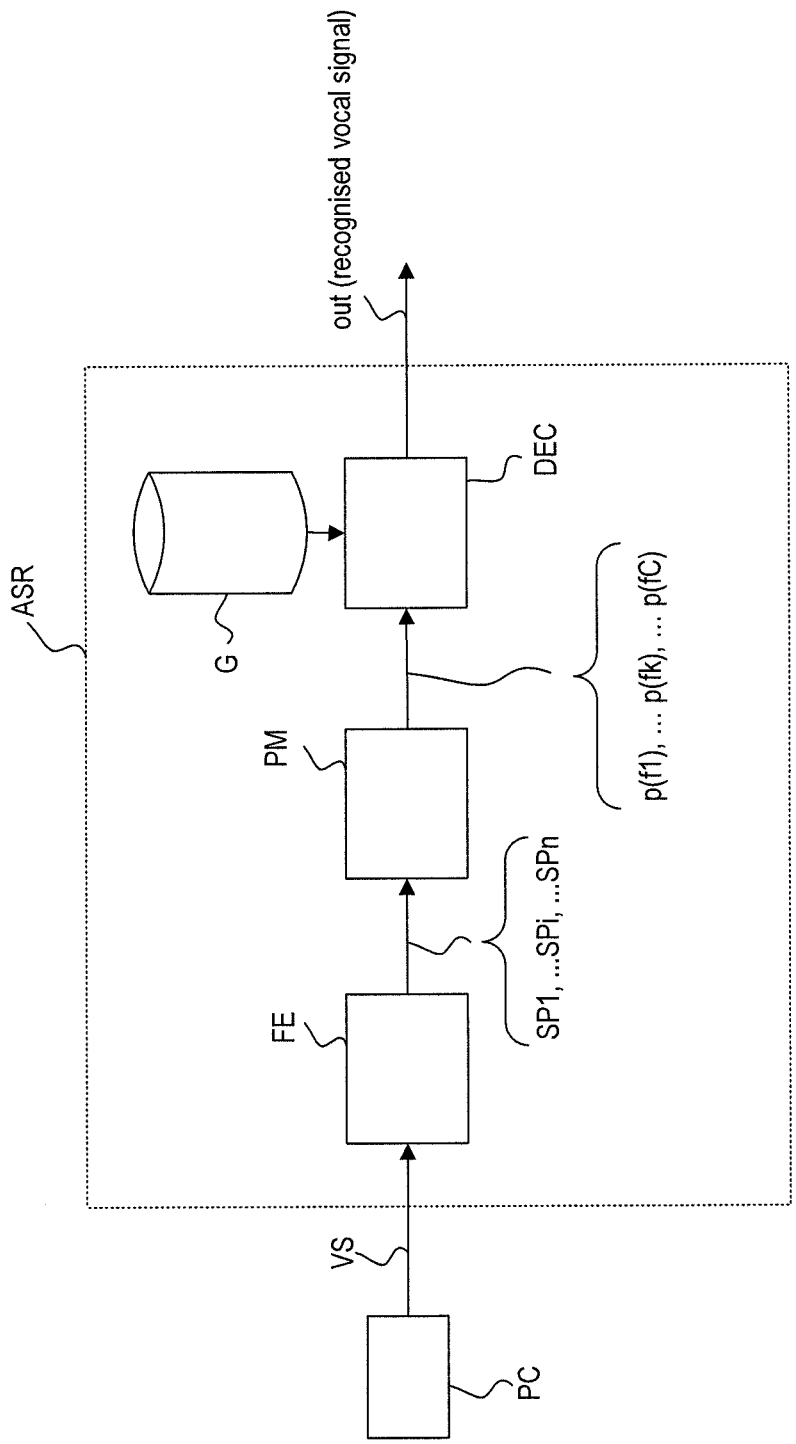
FIG. 1 schematically shows a block diagram of an automatic speech recognition device.

FIG. 1 schematically shows an automatic speech recognition device ASR. The automatic speech recognition device ASR comprises a cascade of a front-end block FE, a pattern matching block PM and a decoder DEC. The decoder DEC is further connected to a database G, comprising vocabulary, grammar rules and/or syntax rules of the language for which the device ASR is intended.

As already mentioned above, the automatic speech recognition device ASR receives from a phonic channel PC a voice signal VS. The front-end block FE digitalizes and samples the voice signal VS, thus generating a sequence of frames, and it associates to each frame a respective set of n spectral parameters SP1, ... SPi, ... SPn. The spectral parameters SP1, ... SPi, ... SPn are sent to the pattern matching block PM, which in turn outputs phoneme probabilities p(f1), ... p(fk), ... p(fC). The phonemes probabilities are sent to the decoder DEC which, according to the information stored into the database G, recognizes the voice signal.

Figure 2:
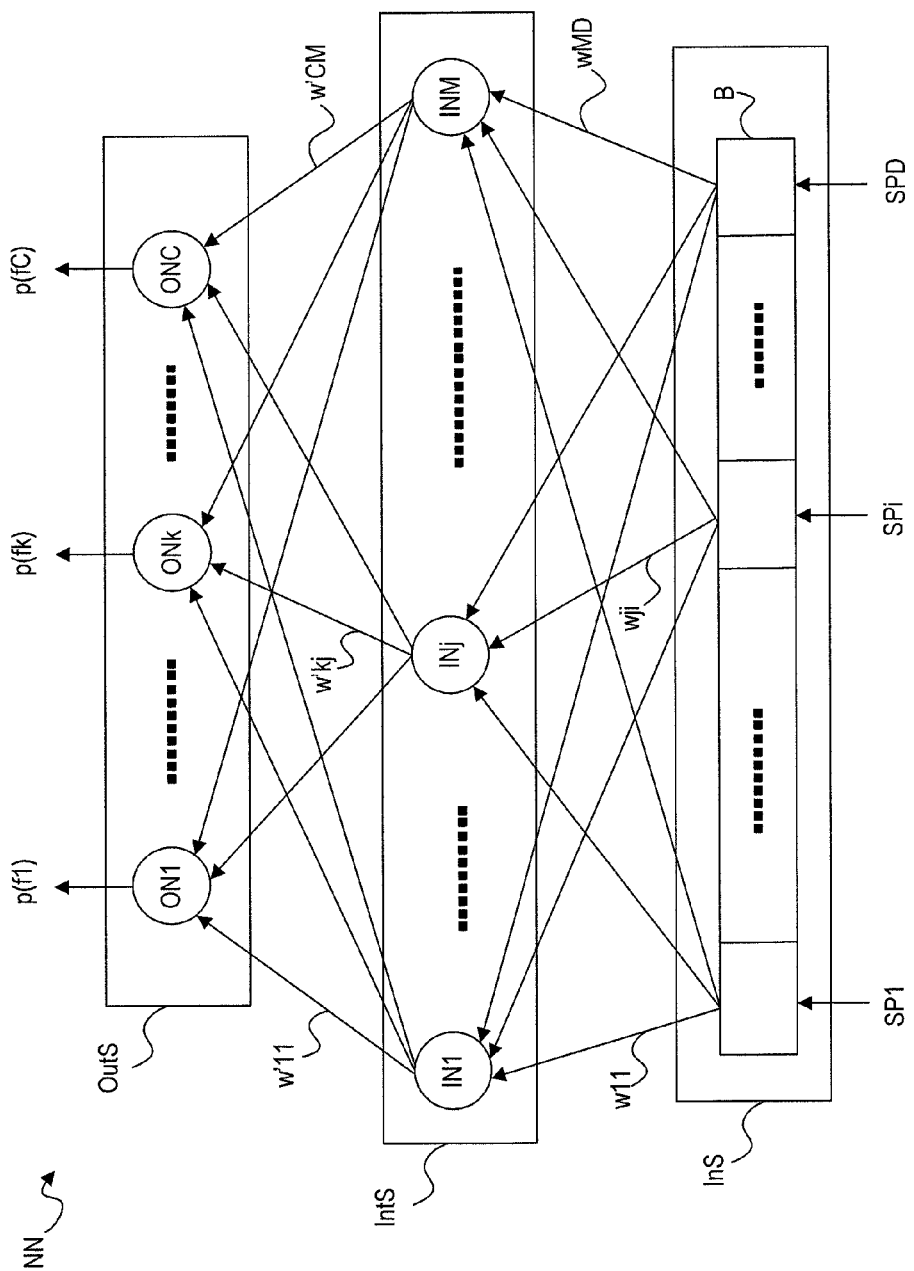
FIG. 2 schematically shows a known three-stage neural network.

As already mentioned, the pattern matching block PM may comprise a multi-layer neural network. FIG. 2 schematically shows a three-stage multi-layer neural network.

The neural network NN of FIG. 2 comprises an input stage InS, an intermediate (hidden) stage IntS and an output stage OutS. The input stage InS comprises a buffer B, which is adapted to store the pattern SP1, ... SPi, ... SPD of an input frame, which comprises, as already mentioned above, the set of spectral parameters SP1, ... SPi, ... SPn associated to the input frame and sets of spectral parameters associated to a number of frames preceding and following the input frame. The intermediate stage IntS comprises a number M of neurons IN1, ... INj, ... INM. Each input connection of each neuron IN1, ... INj, ... INM is adapted to receive a respective spectral parameter of the pattern SP1, ... SPi, ... SPD. Further, each input connection of each neuron IN1, ... INj, ... INM is associated to a respective weight. In FIG. 2, $w_{ji}$ refers to the weight of the i-th input connection of the j-th intermediate stage neuron. For simplicity, as already mentioned, it is assumed that the bias is zero.

The output stage OutS comprises a number C of neurons ON1, ... ONk, ... ONC, wherein C is the number of phonemes. Each neuron ON1, ... ONk, ... ONC has M input connections. Each of the M input connections of each neuron ON1, ... ONk, ... ONC is connected to a respective intermediate stage neuron IN1, ... INj, ... INM. Further, each input connection of each neuron ON1, ... ONk, ... ONC is associated to a respective weight. In FIG. 2, $w'_{kj}$ refers to the weight of the j-th input connection of the k-th output stage neuron. Also in this case, for simplicity, it is assumed that the bias is zero.

The output value computed by each output stage neuron ON1, ... ONk, ... ONC is the probability p(f1), ... p(fk), ... p(fC) according to which the frame associated to the pattern SP1, ... SPi, ... SPD corresponds respectively to the phoneme f1, ... fk, ... fC.

For the neural network NN of FIG. 2, the probability p(fk) of the phoneme fk computed by the neuron ONk is given by the following formula:

$$p(fk) = g'\left[\sum_{j=1}^{M} w'_{kj} \cdot g\left(\sum_{i=1}^{D} w_{ji} \cdot SPi\right)\right], \quad [3]$$

wherein g(•) e g'(•) are the activation functions of the intermediate stage neurons and the output stage neurons, respectively.

Figure 3:
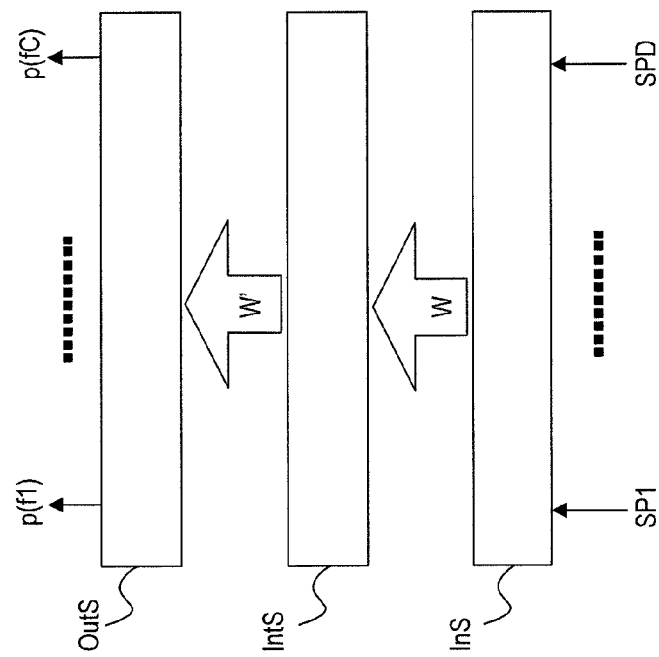
FIG. 3 schematically shows the three-stage neural network of FIG. 2, in a different representation.

FIG. 3 shows a simplified representation of the three-stage neural network NN of FIG. 2. The three stages of the network are represented as rectangles, each rectangle corresponding to a respective stage (InS, IntS, OutS). Input connections of the intermediate stage neurons are associated to a weight matrix W having M rows and D columns, which is defined as:

$$W = \begin{bmatrix} w_{11} & \ldots & w_{1D} \\ \ldots & w_{ji} & \ldots \\ w_{M1} & \ldots & w_{MD} \end{bmatrix}. \quad [4]$$

Similarly, the input connections of the output stage neurons are associated to a weight matrix W' having C rows and M columns, which is defined as:

$$W' = \begin{bmatrix} w'_{11} & \ldots & w'_{1M} \\ \ldots & w'_{kj} & \ldots \\ w'_{CM} & \ldots & w'_{CM} \end{bmatrix}. \quad [5]$$

Figure 4:
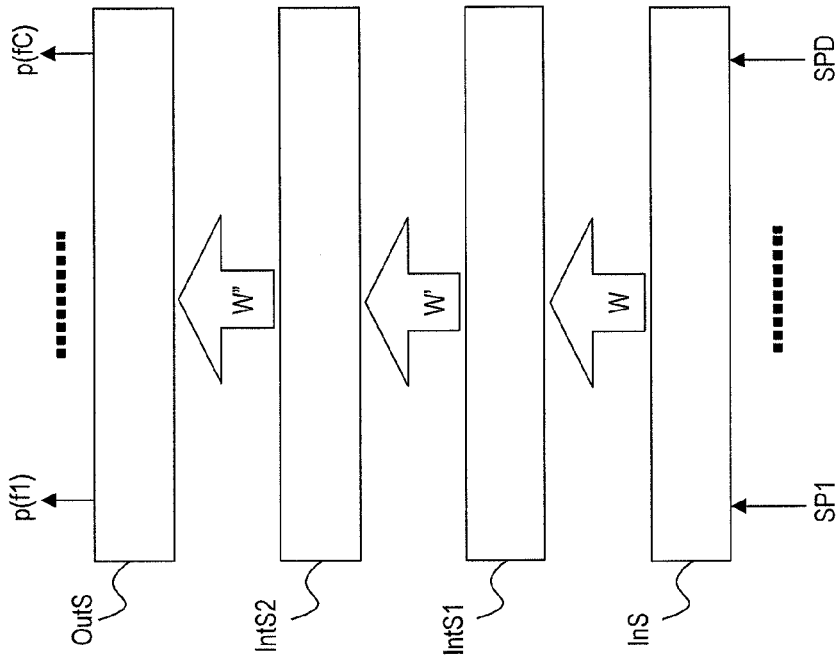
FIG. 4 schematically shows a known four-stage neural network.

FIG. 4 shows a known four-stage neural network. The neural network of FIG. 4 comprises an input stage comprising a buffer (not shown), a first intermediate (hidden) stage IntS1 comprising neurons (not shown), a second intermediate (hidden) layer IntS2 comprising neurons (not shown), and an output stage OutS comprising neurons (not shown). The input connections of the first intermediate stage neurons are associated to a weight matrix W. Similarly, the input connections of the second intermediate stage neurons are associated to a weight matrix W'. Similarly, the input connections of the output stage neurons are associated to a weight matrix W''.

Figure 5:
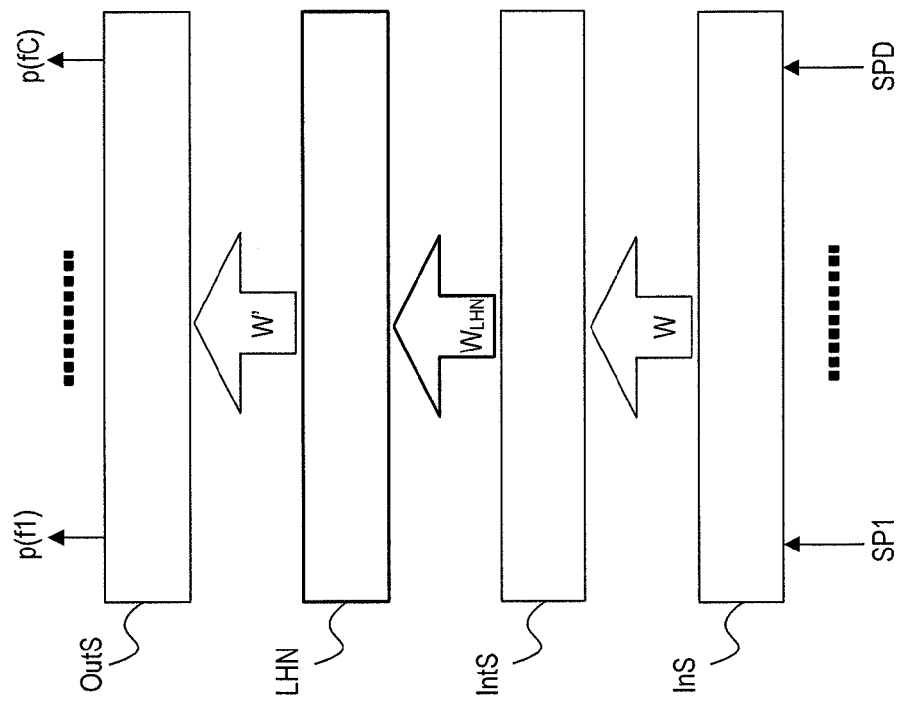
FIG. 5 schematically shows the three-stage neural network of FIG. 3 adapted according to the present invention.

FIG. 5 shows the three-stage neural network of FIG. 3, adapted according to the present invention.

The present invention provides for inserting an additional linear stage LHN after an intermediate stage of a neural network. Such an additional linear stage LHN comprises a plurality of linear neurons, i.e. neurons with linear activation function. The input connections of the additional stage LHN are associated to a weight matrix $W_{LHN}$, as it will be shown in further details herein after.

In the adapted neural network of FIG. 5, the additional linear stage LHN is placed between the intermediate stage IntS and the output stage OutS.

Thus, the spectral parameters SP1, ... SPi, ... SPD are firstly processed by the weight matrix W and the activation function of the intermediate stage IntS.

Then, the additional stage LHN performs a linear transform by means of the weight matrix $W_{LHN}$ and the linear activation function.

Finally, the output values estimated by the additional stage LHN are processed by the weight matrix w and the activation function of the output stage OutS, thus resulting in the phoneme probabilities p(f1), ... p(fk), ... p(fC).

Thus, according to the present invention, the linear transform performed by the additional linear stage LHN is performed not on the input spectral coefficients, but on the spectral coefficient processed by the intermediate stage. This advantageously increases the impact of the linear transform on the overall neural network operation, thus allowing to obtain an adapted neural network with improved performance.

The additional stage LHN, according to the present invention, has a number of neurons which is equal to the number of intermediate stage neurons (M).

According to the present invention, the weight matrix $W_{LHN}$ associated to the input connections of the additional linear stage neurons is optimised by performing an adaptation training by means of an adaptation set. During such an adaptation training, the weight matrixes W and W' are kept fixed.

Preferably, the adaptation training is performed through a so-called Error Back-Propagation algorithm as disclosed, for instance, in C. M. Bishop "Neural networks for pattern recognition", Oxford University Press, 1995, pages 140-148. Such an Error Back-Propagation algorithm consists in computing an error function as the difference between the set of computed phoneme probabilities and a set of target phoneme probabilities. Such an error function is "back-propagated" through the neural network, in order to compute correction values to be applied to the weights of the weight matrixes. According to the present invention, such correction values are applied only to the weights of the weight matrix $W_{LHN}$.

More particularly, the weight matrix $W_{LHN}$ is defined as:

$$W_{LHN} = \begin{bmatrix} w^{LHN}_{11} & \ldots & w^{LHN}_{1M} \\ \ldots & w^{LHN}_{pq} & \ldots \\ w^{LHN}_{M1} & \ldots & w^{LHN}_{MM} \end{bmatrix}, \quad [6]$$

wherein $W^{LHN}_{pq}$ is the weight of the q-th input connection of the p-th linear neuron of the additional stage LHN. As the number of input connections of each linear neuron is equal to the number of linear neurons (M), the weight matrix $W_{LHN}$ is a square M×M matrix.

According to the invention, before performing adaptation training, the weight matrix $W_{LHN}$ is initialised as an identity matrix, i.e.: $w^{LHN}_{pq}=1$ when p=q, $w^{LHN}_{pq}=0$ when p≠q.

Then, by applying the above cited Error Back-propagation algorithm, correction values are computed and applied to each weight $w^{LHN}_{pq}$.

Both FIGS. 8 and 9 show the four-stage neural network of FIG. 4, which is adapted according to the present invention.

Figure 7:
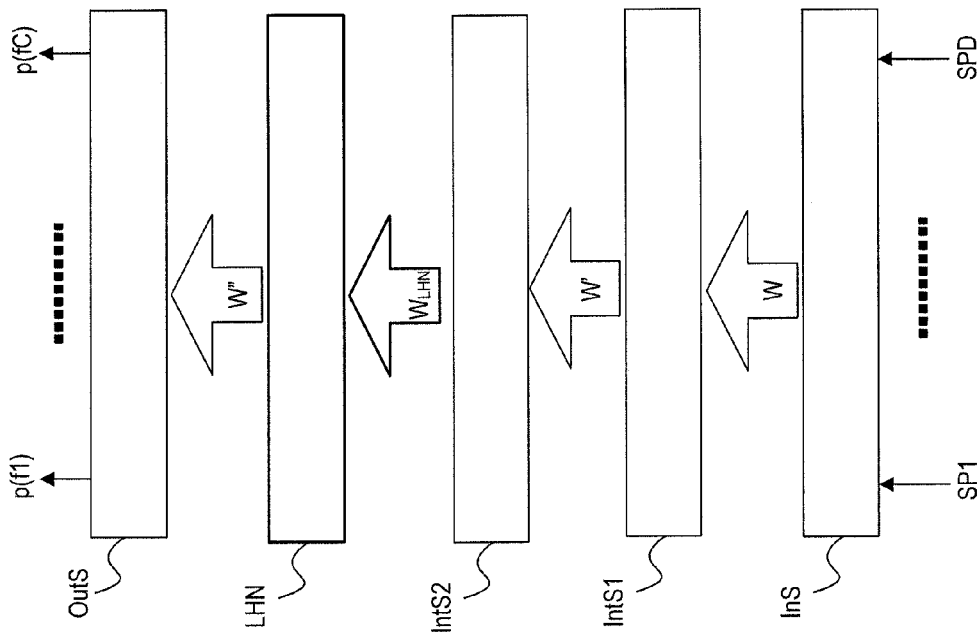
FIG. 7 schematically shows the four-stage neural network of FIG. 4 adapted according to a second example of the present invention.
Figure 6:
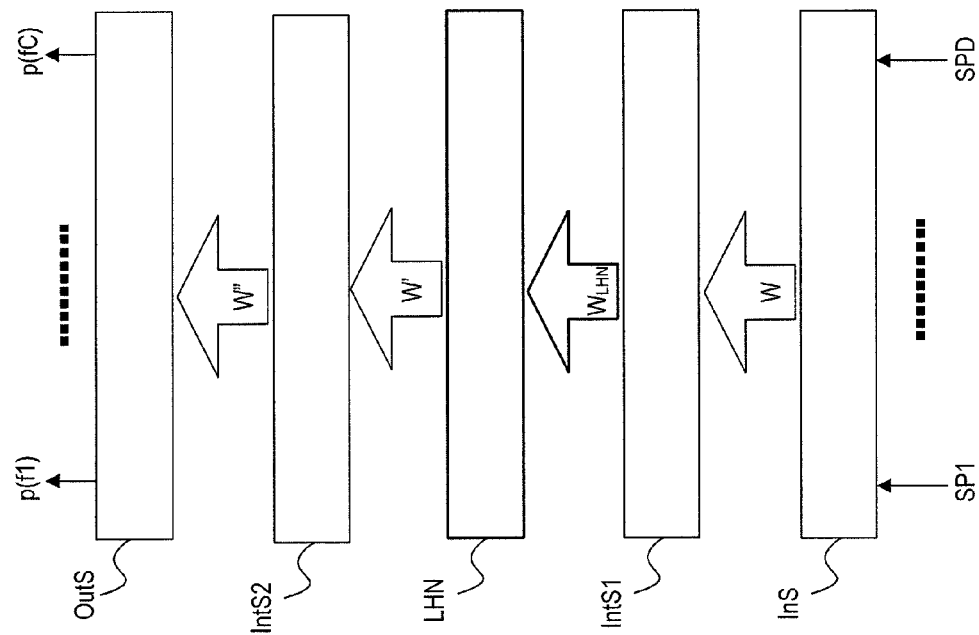
FIG. 6 schematically shows the four-stage neural network of FIG. 4 adapted according to a first example of the present invention.

In the example of FIG. 6, the additional linear stage LHN is inserted between the first intermediate stage IntS1 and the second intermediate stage IntS2. In FIG. 7, the additional linear stage LHN is inserted between the second intermediate stage IntS2 and the output stage OutS. The Applicant has verified that the adapted neural network of FIG. 7 has better performance in comparison with the adapted neural network of FIG. 6, as in the network of FIG. 7 the additional linear stage LHN performs a linear transform on data which has already been subjected to a greater number of processing operations.

Also in these two examples of the method according to the present invention, the weights $w^{LHN}_{pq}$ of the weight matrix $W_{LHN}$ are optimised by performing an adaptation training by means of an adaptation set. During such an adaptation training, the weight matrixes W, W' and W'' are kept fixed.

Preferably, the adaptation training is performed through an Error Back-propagation algorithm, as described above with reference to FIG. 5.

Moreover, as observed also by M. F. BenZeghiba in "Hybrid HMM/ANN and GMM combination for user-customised password speaker verification", IDIAP Research Report, IDIAP-RR 02-45, November 2002, the Applicant has observed that when adapting a generalist neural network, performance relative to recognition of voice signals comprised into the adaptation set improve, but, on the other hand, performance relative to recognition of voice signals not comprised into the adaptation set (the so-called "absent classes") disadvantageously worsen.

More particularly, according to the prior art adaptation methods, the adaptation training of a neural network induces a neural network to compute always a phoneme probability equal to zero for the absent class phonemes. Thus, when an adapted neural network is required to recognise an absent class phoneme, the adapted neural network is not able to perform such a task, as the input connection weights optimised through the adaptation training always induce the network to associate a zero probability to that phoneme.

M. F. BenZeghiba describes a method for overcoming this problem, by adding some examples of phonemes that did not appear in the adaptation data. However, the Applicant has observed that such a method can be improved.

According to a preferred embodiment of the present invention, the additional linear stage weight matrix $W_{LHN}$ is optimised by performing an adaptation training which allows to preserve the performance of the adapted neural network in recognising absent class phonemes.

According to this preferred embodiment, for each frame of the adaptation set, the target phoneme probabilities are chosen as follows:

for absent class phonemes, the target probability is set equal to the probability of the same phonemes estimated by the generalist neural network;

for the phoneme corresponding to the frame, the target probability is set equal to the difference between 1 and the sum of the target probabilities of the absent class phonemes; and for the other phonemes, the target probability is set equal to zero.

Therefore, according to this preferred embodiment of the present invention, the absent class phonemes are associated to a target probability which is different from zero, even if it is known a priori that none of the adaptation set frames corresponds to any of these absent class phonemes. The target probabilities are preferably chosen so that the target probability of the phoneme corresponding to the frame is substantially higher than the target probability of the absent class phonemes, so that the decoder is induced to consider unlikely that the frame corresponds to an absent class phoneme.

Nevertheless, as the target probability of the absent class phoneme is different from zero, the weights $W^{LHN}_{pq}$ after the adaptation training are such that the adapted neural network still has the capability of recognising absent class phonemes.

For simplicity, in the following description, the adaptation training according to the above described preferred embodiment of the present invention will be briefly termed "conservative adaptation training".

In a further preferred embodiment of the present invention, for reducing the complexity and the size of the neural network adapted according to the present invention, the additional linear stage LHN may be "absorbed" with the successive stage. More in particular, after computing the optimum weights $W^{LHN}_{pq}$ through an adaptation training, the additional linear stage LHN and the successive stage are optionally replaced by a single equivalent stage.

For instance, in FIG. 5, the additional linear stage LHN and the output stage OutS may be replaced by a single equivalent stage. The input connections of such an equivalent stage are associated to a weight matrix Weq, which is given by the following formula:

$$Weq = W' \cdot W_{LHN}, \quad [7]$$

wherein W' is the C×M weight matrix associated to the output stage neurones, and "·" indicates the rows-by-column product between matrixes. Further, in case the additional linear stage LHN and the successive stage have a bias, the bias of the equivalent stage can be estimated through the following formula:

$$Beq = W' \cdot B_{LHN} + B, \quad [8]$$

wherein Beq is the bias of the equivalent stage, $B_{LHN}$ is the bias of the additional linear stage LHN and B is the bias of the output stage OutS.

The Applicant has performed a number of comparative tests between a generalist neural network (i.e. before adaptation), the generalist neural network adapted according to the known LIN technique, and the generalist network adapted according to two different embodiments of the present invention.

In the first embodiment, the generalist neural network has been adapted by inserting an additional linear stage (LHN).

In the second embodiment, the generalist neural network has been adapted by inserting an additional linear stage which has been trained through conservative adaptation training (LHN+CT)

The generalist neural network was a four-layer neural network of the type shown in FIG. 4. The buffer B size was 273. The first intermediate stage comprised 315 neurons, whose activation function g(a) is the sigmoid function defined by equation [2]. The second intermediate stage comprised 300 neurons, whose activation function g(a) is the sigmoid function defined by equation [2]. The output stage comprised 683 neurons (for Italian language), whose activation function g(a) is a so-called softmax function, which is a sigmoid function ensuring that the sum of the phoneme probabilities is equal to 1. The generalist neural network has been adapted using different adaptation sets, such as:

application adaptation through adaptation set Comuni-12;
vocabulary adaptation through adaptation set Appl. Words;
vocabulary adaptation through adaptation set Digcon;
channel adaptation through adaptation set Aurora3;
speaker adaptation through adaptation set WSJ0; and
speaker adaptation through adaptation set WSJ1 Spoke-3.

Each adaptation set is associated to a respective test set. The ensemble of a training set and its respective test set is usually termed "corpus".

As it is known, the WSJ0 corpus, which has been defined by DARPA Spoken Language Program, has a vocabulary comprising 5000-20000 English words. In the experimentation performed by the Applicant, a 5000 word vocabulary has been used. The adaptation set used by the Applicant comprised 40×8=320 adaptation sentences, uttered by eight different speakers. The test set comprised 40×8=320 test sentences, uttered by the same eight different speakers. As phonic channel, a Sennheiser HMD414 microphone has been used, both during the adaptation training and during the tests.

Besides, the WSJ1 Spoke-3 corpus, which has been defined by DARPA Spoken Language Program, has a vocabulary comprising 5000 English words. The adaptation set used by the Applicant comprised 40×8=320 adaptation sentences, uttered by ten different non-native speakers. The test set comprised 40×8=320 test sentences, uttered by the same ten different non-native speakers.

The Aurora3 corpus, which has been defined by European Union funded SpeechDat-Car project, has a vocabulary comprising 2200 Italian connected digit utterances, divided into training utterances and test utterances. These utterances are affected by different noise types inside a car (high speed good road, low speed rough road, car stopped with motor running, and town traffic). The adaptation set used by the Applicant comprised 2951 connected digits utterances, while the test set comprised 1309 connected digits utterances.

The Comuni-12 corpus, which has been defined by the Applicant, has a vocabulary comprising 9325 Italian town names. The adaptation set used by the Applicant comprised 53713 adaptation utterances, while the test set comprised 3917 test utterances.

The AppWord corpus, which has been defined by the Applicant, has a vocabulary comprising applicative Italian words such as "avanti", "indietro", "fine", or the like. The adaptation set used by the Applicant comprised 6189 adaptation utterances, while the test set comprised 3094 test utterances.

The Digcon corpus, which has been defined by the Applicant, is a subset of the SpeechDat corpora. The adaptation set used by the Applicant comprised 10998 adaptation utterances, while the test set comprised 1041 test utterances.

Table 1 reported below shows the results of the tests. Performance is expressed as word recognition percentage. For each adapted network, the performance is evaluated by referring to the test set coherent with the respective adaptation set. For the generalist neural network, performance is evaluated for all the above reported test sets.

TABLE 1

| adaptation method | Vocabulary | | | Speaker | |
|---|---|---|---|---|---|
| | Application Comuni-12 | Appl. Words | Digcon | Channel Aurora 3 | WSJ0 | WSJ1 Spoke-3 |
| none | 85.4 | 96.2 | 98.6 | 87.9 | 82.8 | 49.7 |
| LIN | 88.8 | 96.6 | 98.5 | 94.2 | 85.2 | 57.4 |
| LHN | 90.4 | 97.9 | 99.1 | 95.0 | 86.4 | 70.2 |
| LHN + CT | 89.9 | 97.7 | 99.0 | 94.6 | 87.4 | 71.6 |

It can be noticed that, for all the considered test sets, the generalist neural network has exhibited the worst performance, as it has not been adapted to any of the considered test sets.

Neural network adapted through the known LIN technique has shown improved performance for each adaptation set, except the adaptation set Digcon.

Performance has been further improved by adapting the generalist network according to the first embodiment of the present invention (LHN). In particular, in case of adaptation set WSJ1 Spoke-3, an improvement from 57.4% (LIN technique) to 70.2% (LHN) has been obtained.

Moreover, it can be noticed that also the neural network adapted according to the second embodiment of the present invention (LHN+CT) has shown, for all the considered adaptation sets, better performance in comparison with neural networks adapted according to the LIN technique.

Therefore, the Applicant has proven that a neural network adapted according to the present invention exhibits better word recognition performance in comparison with neural networks adapted according to the prior art.

Table 2 shows the results of a further comparative test of Italian continuous speech recognition for some of the above cited adaptation tests. Performance is expressed as speech recognition accuracy, which is obtained by subtracting from the recognised word percentage both the word insertion percentage and the word deletion percentage.

TABLE 2

| adaptation method | Comuni-12 (4%) | App. Words (48%) | Digcon (86%) | Aurora3 (86%) |
|---|---|---|---|---|
| none | | 70.7 | | |
| LIN | 63.7 | 57.3 | 23.3 | −8.6 |
| LHN | 59.4 | 36.3 | −47.3 | −52.1 |
| LHN + CT | 59.3 | 54.7 | 60.6 | 55.8 |

In this second test, the voice signal comprises both phonemes comprised into the adaptation sets, and absent class phonemes.

The smaller the adaptation set, the higher the absent class phoneme percentage. Table 2 shows, within parentheses, the absent class phoneme percentage of each adaptation set.

The generalist neural network exhibits a speech recognition accuracy equal to 70.7%.

In case of neural networks adapted through LIN technique, performance worsen in comparison with the generalist network. Such a worsening increases with the increase of absent class phoneme percentage. In the worst case (Aurora3, with an absent class phoneme percentage equal to 86%), the speech recognition accuracy falls to −8.6%.

In case of neural network adapted according to the first embodiment of the present invention (LHN), the speech recognition accuracy still worsens for all the considered cases. The worst case is for Aurora3, wherein the speech recognition accuracy falls from −8.6% to −52.1%.

However, by applying the second embodiment of the present invention (LHN+CT), for high absent class phoneme percentage, the conservative adaptation training advantageously allows to improve the performance. For instance, with the adaptation set Digcon, the speech recognition accuracy increases from −47.3% (LHN) to 60.6% (LHN-CT), while for the adaptation set Aurora3 the speech recognition accuracy increases from −52.1% to 55.8%.

Thus, by combining Table 1 and 2, it can be noticed that the present invention advantageously allows to obtain, for most of the considered adaptation sets, improved performance in word recognition test performed through test sets coherent with the respective adaptation sets. Besides, an improvement in speech recognition accuracy can be obtained by performing a conservative adaptation training according to a preferred embodiment of the present invention.

The invention claimed is:

1. A method of adapting a neural network of an automatic speech recognition device, comprising the steps of:
providing a neural network comprising an input stage for storing at least one voice signal sample, an intermediate stage and an output stage, said output stage outputting phoneme probabilities;
providing a linear stage in said neural network; and
training said linear stage by means of an adaptation set,
wherein the step of providing said linear stage comprises the step of providing said linear stage after said intermediate stage;
wherein the step of training said linear stage comprises training said linear stage so that the phoneme probability of a phoneme belonging to an absent class is equal to the phoneme probability of said phoneme calculated by said neural network before the step of providing a linear stage; and wherein the step of training said linear stage further comprises training said linear stage so that the phoneme probability of the phoneme corresponding to a voice signal sample of said adaptation set is calculated by subtracting the phoneme probabilities of all the phonemes belonging to said absent class from 1.

2. The method according to claim 1, wherein the step of training said linear stage comprises training said linear stage so that the phoneme probability of the remaining phonemes is set equal to zero.

3. The method according to claim 1, wherein the step of providing said linear stage comprises the step of providing said linear stage between said intermediate stage and said output stage.

4. The method according to claim 1, wherein the step of providing said neural network comprises the step of providing a neural network comprising two intermediate stages and wherein the step of providing said linear stage comprises providing said linear stage between said two intermediate stages.

5. The method according to claim 1, wherein the step of training said linear stage comprises the step of training said linear stage by means of an error back-propagation algorithm.

6. The method according to claim 1, further comprising a step of providing an equivalent stage obtained by combining said linear stage and either the following intermediate stage or the output stage.

7. A neural network comprising:
a computer;
an input stage for storing at least one voice signal sample;
an intermediate stage;
an output stage; and
a linear stage which is to be trained by means of an adaptation set,
wherein said output stage is configured to output phoneme probabilities;
wherein said linear stage is provided after said intermediate stage and is configured to be trained so that the phoneme probability of a phoneme belonging to an absent class is equal to the phoneme probability of said phoneme calculated by said neural network before the step of providing a linear stage; and
wherein said linear stage is configured to be trained so that the phoneme probability of the phoneme corresponding to a voice signal sample of said adaptation set is calculated by subtracting the phoneme probabilities of all the phonemes belonging to said absent class from 1.

8. The neural network according to claim 7, wherein said linear stage is configured to be trained so that the phoneme probability of the remaining phonemes is set equal to zero.

9. The neural network according to claim 7, wherein said linear stage is provided between said intermediate stage and said output stage.

10. The neural network according to claim 7, wherein the neural network comprises two intermediate stages and said linear stage is provided between said two intermediate stages.

11. The neural network according to claim 7, wherein said linear stage is configured to be trained by means of an error back-propagation algorithm.

12. The neural network according to claim 7, wherein the neural network comprises an equivalent stage obtained by combining said linear stage and either the following intermediate stage or the output stage.

13. An automatic speech recognition device comprising a pattern matching block comprising a neural network according to claim 7.

14. A non-transitory computer readable medium having a program recorded thereon, said computer readable medium comprising a computer program code portion for performing all the steps of claim 1, when said computer program code portion is executed by a computer.

15. A method of adapting a multi-layer neural network of an automatic speech recognition device, comprising the steps of:
providing a neural network comprising an input stage for storing at least one voice signal sample, an intermediate stage having input connections associated to a first weight matrix and an output stage having input connections associated to a second weight matrix, said output stage outputting phoneme probabilities;
providing a linear stage in said neural network after said intermediate stage, said linear stage having a same number of nodes as said intermediate stage; and
training said linear stage by means of an adaptation set, said first weight matrix and said second weight matrix being kept fixed during said training,
wherein the step of training said linear stage comprises training said linear stage so that the phoneme probability of a phoneme belonging to an absent class is equal to the phoneme probability of said phoneme calculated by said neural network before the step of providing a linear stage; and
wherein the step of training said linear stage comprises training said linear stage so that the phoneme probability of the phoneme corresponding to a voice signal sample of said adaptation set is calculated by subtracting the phoneme probabilities of all the phonemes belonging to said absent class from 1.

16. A multi-layer neural network computation module, comprising:
a computer;
an input stage for storing at least one voice signal sample;
an intermediate stage having input connections associated to a first weight matrix;
an output stage having input connections associated to a second weight matrix; and
a linear stage configured to be trained by means of an adaptation set,
wherein said first weight matrix and said second weight matrix are kept fixed while said linear stage is trained;
wherein said output stage is configured to output phoneme probabilities;
wherein said linear stage is provided after said intermediate stage, said linear stage having a same number of nodes as said intermediate stage;
wherein said linear stage is provided after said intermediate stage and is configured to be trained so that the phoneme probability of a phoneme belonging to an absent class is equal to the phoneme probability of said phoneme calculated by said neural network before the step of providing a linear stage; and
wherein said linear stage is configured to be trained so that the phoneme probability of the phoneme corresponding to a voice signal sample of said adaptation set is calculated by subtracting the phoneme probabilities of all the phonemes belonging to said absent class from 1.

* * * * *

UNITED STATES PATENT AND TRADEMARK OFFICE
CERTIFICATE OF CORRECTION

PATENT NO.         : 8,126,710 B2
APPLICATION NO.    : 11/921303
DATED              : February 28, 2012
INVENTOR(S)        : Roberto Gemello and Franco Mana It is certified that error appears in the above-identified patent and that said Letters Patent is hereby corrected as shown below:

On the Title Pg

Item (73) delete "Loquendo S.p.A., Turin (IT)" and insert --Loquendo S.P.A., Torino (IT)--

Signed and Sealed this
Tenth Day of April, 2012

David J. Kappos
*Director of the United States Patent and Trademark Office*